(12) United States Patent
Saito et al.

(10) Patent No.: US 6,417,591 B1
(45) Date of Patent: Jul. 9, 2002

(54) MAGNETIC COUPLING MECHANISM FOR USE IN LASER APPARATUS

(75) Inventors: Takashi Saito, Tokyo; Motohiro Arai, Gotenba, both of (JP)

(73) Assignees: Kabushiki Kaisya Ushiosougougizyutsukenkyusoyo; Ushio Denki Kabushiki Kaisya, both of Tokyo (JP)

( * ) Notice: Subject to any disclaimer, the term of this patent is extended or adjusted under 35 U.S.C. 154(b) by 0 days.

(21) Appl. No.: 09/573,067

(22) Filed: May 16, 2000

(30) Foreign Application Priority Data

May 19, 1999 (JP) .......................................... 11-138382

(51) Int. Cl.[7] .......................... H02K 7/11; F04B 35/04; H01S 3/22
(52) U.S. Cl. .................. 310/104; 310/75 D; 464/29; 372/55; 372/57; 417/420
(58) Field of Search .................. 310/103, 104, 310/45, 75 D, 92, 156.28; 464/29; 372/55, 57, 72, 81, 82, 98, 103, 109; 417/420

(56) References Cited

U.S. PATENT DOCUMENTS

| | | | | |
|---|---|---|---|---|
| 1,847,006 A | * | 2/1932 | Kalischer | 310/104 |
| 2,460,015 A | * | 1/1949 | Jones | 310/104 |
| 4,163,164 A | * | 7/1979 | Pieters | 310/103 |
| 4,674,960 A | * | 6/1987 | Rando et al. | 417/420 |
| 4,722,661 A | * | 2/1988 | Mizuno | 415/131 |
| 4,959,840 A | * | 9/1990 | Akins et al. | 372/57 |
| 5,090,944 A | * | 2/1992 | Kyo et al. | 464/29 |
| 5,373,523 A | * | 12/1994 | Fujimoto | 372/59 |
| 5,763,973 A | * | 6/1998 | Cramer | 310/103 |
| 5,831,364 A | * | 11/1998 | Buse | 310/156 |
| 6,031,310 A | * | 2/2000 | Ishikawa et al. | 310/156 |
| 6,128,323 A | * | 10/2000 | Myers et al. | 372/38 |
| 6,181,040 B1 | * | 1/2001 | Schob | 310/90.5 |

* cited by examiner

Primary Examiner—Nicholas Ponomarenko
Assistant Examiner—Dang Dinh Le
(74) Attorney, Agent, or Firm—Dellett and Walters

(57) ABSTRACT

A magnetic coupling mechanism which can transmit rotational force of a motor with high efficiency and is simple in mechanism and unlikely to damage bearings, etc. and also unlikely to contaminate a laser gas, and in which flakes from plating or the like will not cause an operational abnormality. The magnetic coupling mechanism transmits rotational force from a motor shaft outside a laser chamber filled with a laser gas to a shaft of a gas-circulating fan in the laser chamber to rotate the fan. A first magnet group is provided on an inner peripheral surface at one end of the motor shaft. A second magnet group is radially coupled to the first magnet group through a ceramic partition constituting a part of the wall of a container of the laser chamber. The second magnet group is provided on the outer peripheral surface of the fan shaft.

4 Claims, 3 Drawing Sheets

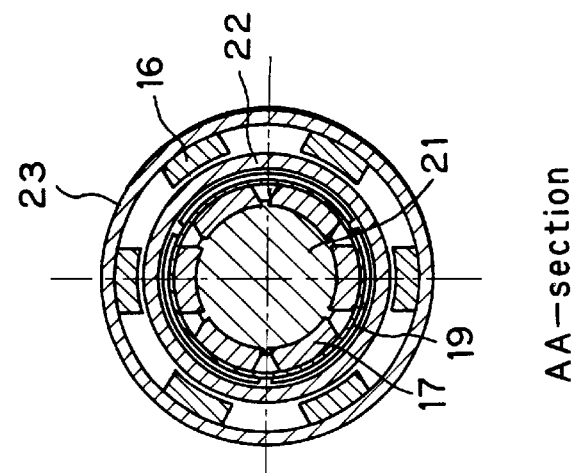
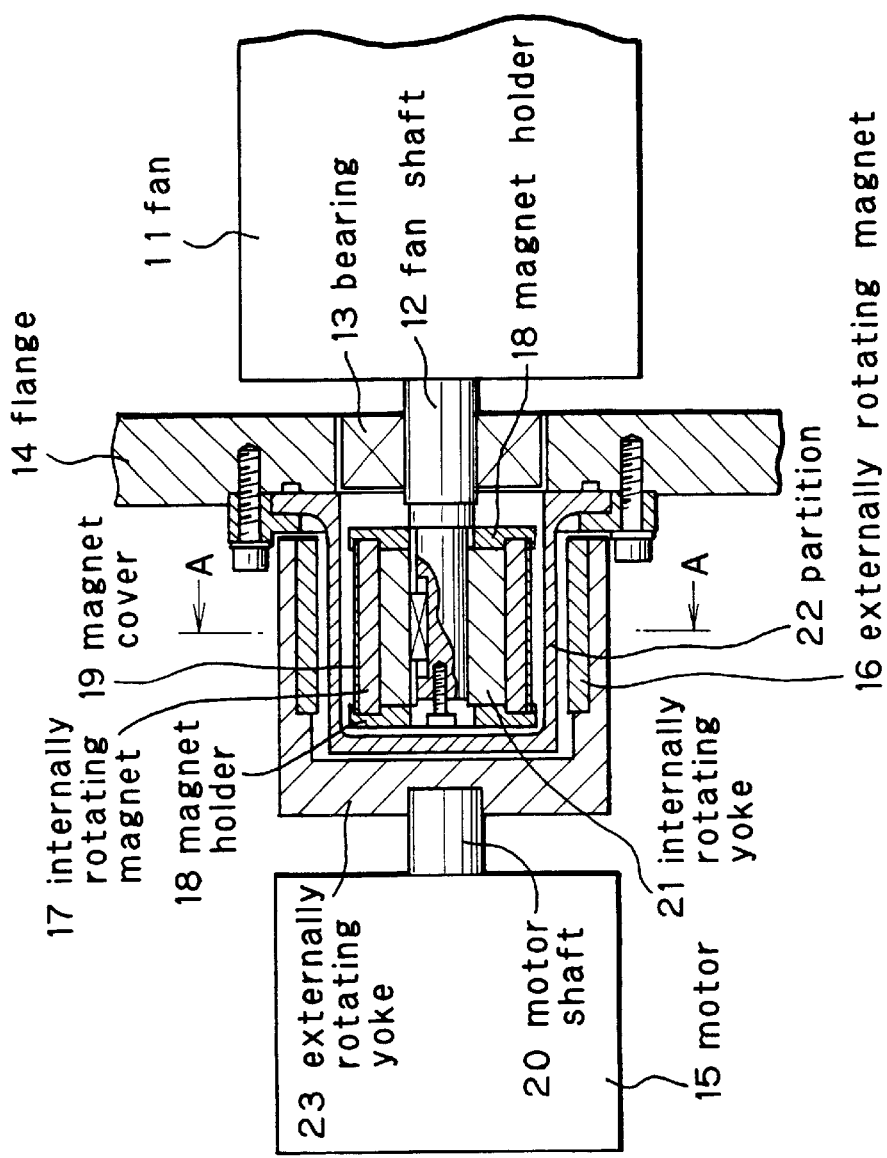

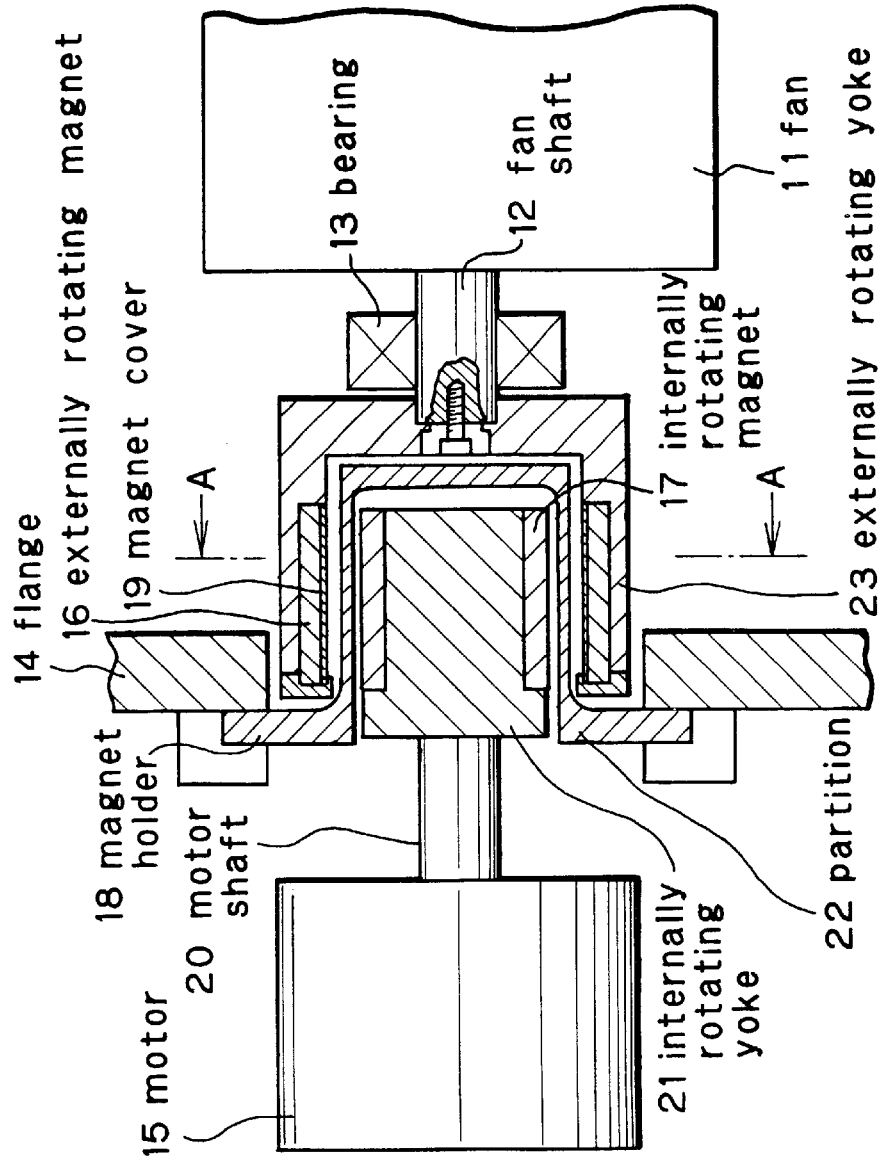
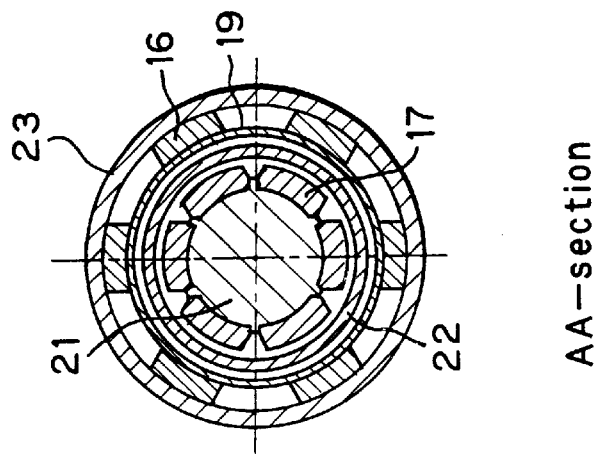

MAGNETIC COUPLING MECHANISM FOR USE IN LASER APPARATUS

BACKGROUND OF THE INVENTION

The present invention relates to a magnetic coupling mechanism for use in a laser apparatus. More particularly, the present invention relates to a coupling mechanism for driving a gas-circulating fan for an excimer laser.

In an electric discharge pumping laser apparatus, a fan for circulating a laser gas is disposed in a container having a laser gas sealed therein, and it is necessary to transmit rotational force from a motor disposed outside the container to the fan. For this purpose, a magnetic coupling mechanism capable of transmitting rotational force without having mechanical contact has heretofore been used.

FIG. 3 shows schematically the arrangement of a laser apparatus using a conventional magnetic coupling mechanism. Part (a) of FIG. 3 is a sectional view taken along a plane perpendicular to the direction of laser oscillation, and part (b) of FIG. 3 is a fragmentary sectional view taken along a plane parallel to the direction of laser oscillation, showing a magnetic coupling part. A container 10 is provided therein with a fan 11 for forming a stream 1 of a laser gas (in the case of an ArF excimer laser, a mixed gas of Ar gas, $F_2$ gas and Ne gas; in the case of a fluorine laser, a mixed gas of $F_2$ gas and He gas, for example). The container 10 is further provided therein with electrodes 2a and 2b for pumping the laser gas, heat exchangers 3, etc. The electrodes 2a and 2b are provided in the upper part of the container 10 at respective positions which face each other to perform electric discharge necessary for laser oscillation. The fan 11 is placed in the lower part of the container 10 to circulate the laser gas in the container 10. The laser gas heated by electric discharge between the electrodes 2a and 2b is agitated by the fan 11 to induce a gas stream 1. The gas stream 1 circulates in the container 10 while being cooled by the heat exchangers 3 provided in a side portion of the container 10.

A motor 15 is installed outside the container 10. An atmosphere-side magnetic joint 4 is secured to the distal end of a rotating shaft (motor shaft) 20 of the motor 15. A gas-side magnetic joint 5 is secured to the distal end of a rotating shaft (fan shaft) 12 of the fan 11. The magnetic joints 4 and 5 are members having respective permanent magnets therein. The magnetic joints 4 and 5 are disposed to face each other across a partition 6 of the container 10. Rotational force of the rotating shaft 20 of the motor 15 is transmitted to the rotating shaft 12 of the fan 11 through magnetic coupling between the permanent magnets of the magnetic joints 4 and 5. Thus, the fan 11 is driven to rotate (for example, see Japanese Utility Model Application Unexamined Publication (KOKAI) No. 6-45358).

In the above-described magnetic coupling mechanism, a metal is used as the partition 6 for dividing the atmosphere side and the laser gas side from each other. However, when a metal is used as the partition 6 between the magnetic joints 4 and 5, eddy currents are induced in the partition 6 as the magnets rotate, causing heat to be generated. Therefore, the rotational force transmission efficiency is unfavorably low, and the structure becomes undesirably complicated because of the need for a cooling mechanism and so forth. In addition, because coupling force between the magnetic joints 4 and 5 acts in the thrust direction (axial direction), bearings for supporting the rotating shafts 20 and 12 are likely to be damaged.

In the prior art, further, the magnet used in the magnetic joint 5 placed in the laser gas is plated with nickel and coated with a fluorocarbon resin material to provide corrosion resistance to $F_2$ gas in the laser gas. However, it is difficult to plate the magnet completely. Therefore, the plating or the like flakes off with time, and hence the magnet corrodes. This causes the laser gas to be contaminated. In addition, flakes from the plating are likely to enter the space between the partition 6 and the magnetic joint 5, causing an operational abnormality.

SUMMARY OF THE INVENTION

In view of the above-described problems associated with the prior art, an object of the present invention is to provide a magnetic coupling mechanism for use in a laser apparatus, which is designed so that it can transmit rotational force of a motor with high efficiency and is simple in mechanism and unlikely to damage bearings, etc. and also unlikely to contaminate a laser gas, and flakes from plating or the like will not cause an operational abnormality.

To attain the above-described object, the present invention provides a magnetic coupling mechanism for use in a laser apparatus, which is adapted to transmit rotational force from a shaft outside a laser chamber filled with a laser gas to a shaft of a gas-circulating fan in the laser chamber to rotate the gas-circulating fan. A first magnet group is provided on an outer peripheral surface at one end of either of the two shafts. A second magnet group is radially coupled to the first magnet group through a ceramic partition constituting a part of the wall of a container of the laser chamber. The other shaft has the second magnet group provided on an inner peripheral surface thereof.

In this case, it is desirable that the surface of each magnet in the magnet group provided on the shaft in the laser chamber should be plated, and a surface of each magnet in this magnet group exposed in the laser chamber should be covered with a metal member.

It is also desirable that the thickness of the ceramic partition should be within the range of from 1.5 to 10 millimeters.

It is also desirable that the ceramic partition should be made of aluminum oxide, and the purity thereof should be not lower than 99.5%.

In the present invention, the magnetic coupling mechanism includes a first magnet group provided on an outer peripheral surface at one end of either of two shafts and a second magnet group radially coupled to the first magnet group through a ceramic partition constituting a part of the wall of the container of the laser chamber. The other shaft has the second magnet group provided on an inner peripheral surface thereof. Therefore, when rotational force is coupled, no eddy currents are induced in the partition, and no heat is generated. Accordingly, there is no reduction in rotational force transmission efficiency, and there is no need to provide a complicated mechanism, e.g. a cooling mechanism. Moreover, because force produced between the first magnet group and the second magnet group acts in the radial direction, but not in the thrust direction, there is no likelihood that bearings, etc. will be damaged by the force. If a high-purity aluminum oxide having a purity not lower than 99.5% is used for the ceramic partition hermetically dividing the laser gas side and the atmosphere side from each other, no impurities will be generated, which would otherwise contaminate the laser gas. If the surface of each magnet in the magnet group provided on the shaft in the laser chamber is plated and a surface of each magnet in this magnet group exposed in the laser chamber is covered with a metal member, the magnet group does not directly contact the laser gas. Even if the plating provided on the magnet surface becomes likely to flake off as time goes by, flakes from the plating will not enter the space between the partition and the laser chamber-side rotating member to cause an operational abnormality. Accordingly, it is possible to perform a stable operation for a long period of time.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

BRIEF DESCRIPTION OF THE DRAWINGS

FIGS. 1(a) and 1(b) are sectional views showing the structure of a magnetic coupling mechanism according to an embodiment of the present invention.

FIGS. 2(a) and 2(b) are sectional views showing the structure of a magnetic coupling mechanism according to another embodiment of the present invention.

DESCRIPTION OF THE PREFERRED EMBODIMENTS

Embodiments of a magnetic coupling mechanism for use in an excimer laser apparatus using a laser gas containing $F_2$ gas will be described below as an example of the present invention with reference to the accompanying drawings.

FIG. 1 shows the structure of a magnetic coupling mechanism according to an embodiment of the present invention. Part (a) of FIG. 1 is a sectional view taken along a plane containing the center axis of a motor shaft and the center axis of a fan shaft, and part (b) of FIG. 1 is a sectional view taken along a plane containing the it. straight line A—A in part (a) of FIG. 1 and perpendicular to the center axis of the motor shaft.

Figure 3A:
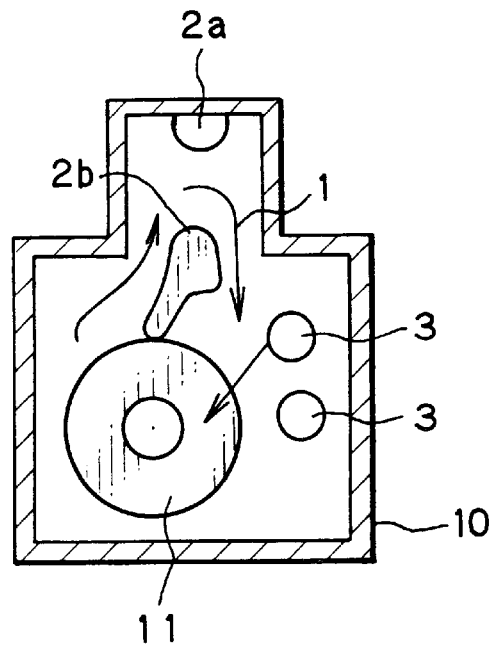
FIGS. 3(a) and 3(b) are diagrams schematically showing the arrangement of a laser apparatus using a conventional magnetic coupling mechanism.
Figure 3B:
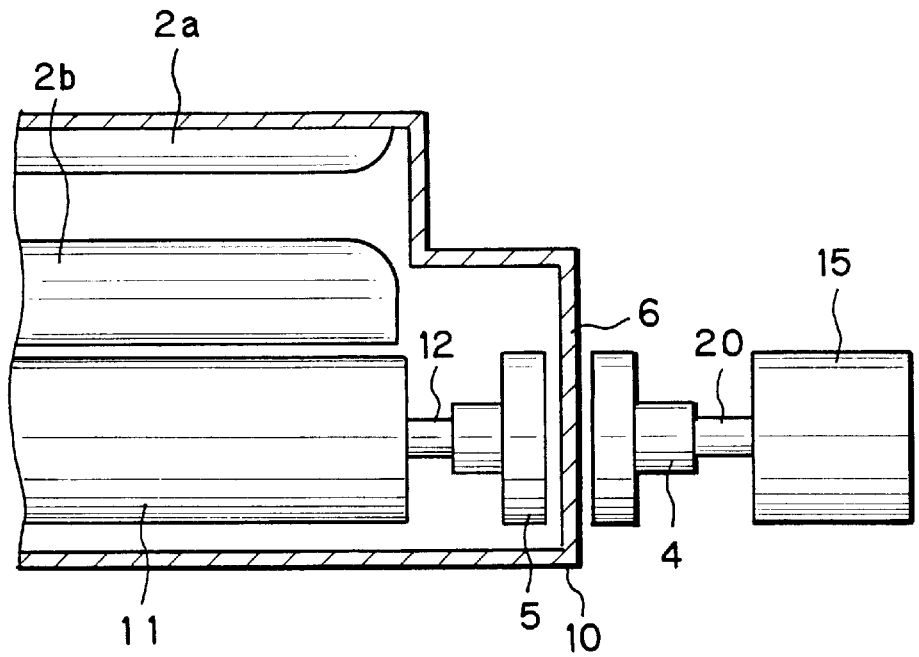

In this embodiment, an excimer laser apparatus has a container 10 (see FIG. 3) having an excimer gas sealed therein. A ceramic partition 22 in the shape of a cylinder, one end of which is closed, is hermetically secured to an opening portion of a flange 14 provided on the wall of the container 10 by an appropriate device such that the partition 22 covers the opening of the flange 14 (in the illustrated example, a projection at the open end of the partition 22 is covered with a retaining plate and secured to the flange 14 with screws). The ceramic closed-end cylinder-shaped partition 22 hermetically divides the inside (gas side) of the container 10 and the outside (atmosphere side) of the container 10 from each other. In this embodiment, the ceramic closed-end cylinder-shaped partition 22 is made of a ceramic material consisting essentially of high-purity alumina, which is not corroded by $F_2$ gas in the excimer gas. As shown in FIG. 1, the partition 22 is secured to the flange 14 so as to project toward the atmosphere side.

A motor 15 is installed on the atmosphere side. A cylindrical externally rotating yoke (magnetic material) 23 is concentrically secured to the distal end of a rotating shaft (motor shaft) 20 of the motor 15. A plurality (6 in the illustrated example) of externally rotating magnets (permanent magnets) 16 are secured to the inner surface of the externally rotating yoke 23 in such a manner as to be spaced circumferentially and extend parallel to each other in the axial direction. The externally rotating yoke 23 and the closed-end cylinder-shaped partition 22, which projects toward the atmosphere side, are concentrically fitted to each other such that the externally rotating magnets 16 concentrically surround the closed-end cylinder-shaped partition 22, and that the externally rotating yoke 23 and the closed-end cylinder-shaped partition 22 do not contact each other.

Meanwhile, a fan 11 is installed on the gas side in the container 10. A rotating shaft (fan shaft) 12 of the fan 11 projects into the closed-end cylinder-shaped partition 22 through a bearing 13 installed in the opening of the flange 14. A cylindrical internally rotating yoke (magnetic material) 21 is concentrically secured to the projecting end of the rotating shaft 12. A plurality of internally rotating magnets (permanent magnets) 17 (6 magnets in the illustrated example, which is the same as the number of externally rotating magnets 16) are secured to the outer periphery of the internally rotating yoke 21 in such a manner as to be spaced circumferentially and extend parallel to each other in the axial direction.

The internally rotating magnets 17 each have anti-corrosive nickel plating or the like provided on the surface thereof to prevent corrosion of a rare earth metal, e.g. samarium or neodymium, which is a component thereof, by $F_2$ gas in the laser gas as in the case of the conventional practice. To prevent flakes from the plating or the like from entering the space between the partition 22 and the internally rotating yoke 21, which would otherwise cause an operational abnormality, a cylindrical magnet cover 19 made of a metal (e.g. stainless steel) is fitted so as to cover the whole outer periphery of each of the internally rotating magnets 17 secured to the outer periphery of the internally rotating yoke 21. Further, ring-shaped magnet holders 18 made of a metal (e.g. stainless steel) are secured closely to both ends of the assembly of the internally rotating magnets 17 and the magnet cover 19 to cover the two ends of the assembly and to secure the internally rotating magnets 17 to the internally rotating yoke 21, thereby preventing the internally rotating magnets 17 from directly contacting the laser gas and, at the same time, preventing plating flakes or the like from the internally rotating magnets 17 from leaking out into the laser gas.

By virtue of the described arrangement, the externally rotating yoke 23 secured to the motor shaft 20 of the motor 15 is concentrically located radially outside the closed-end cylinder-shaped partition 22, and internally rotating yoke 21 integrally secured to the rotating shaft 12 of the fan 11 is concentrically located radially inside the closed-end cylinder-shaped partition 22. Thus, rotational force of the motor 15 is magnetically transmitted to the fan 11 by magnetic forces acting between the externally rotating magnets 16 secured to the inner periphery of the externally rotating yoke 23 and the internally rotating magnets 17 secured to the outer periphery of the internally rotating yoke 21. Moreover, because the closed-end cylinder-shaped partition 22 between the externally rotating yoke 23 and the internally rotating yoke 21 is made of a ceramic material, no eddy currents are induced in the closed-end cylinder-shaped partition 22 even when the yokes 23 and 21 rotate, and hence no heat is generated. Therefore, the rotational force transmission efficiency will not reduce, and there is no need to provide a cooling mechanism. Moreover, because force produced between the externally rotating yoke 23 and the internally rotating yoke 21 acts in the radial direction, but not in the thrust direction, there is no likelihood that the bearing 13, etc. will be damaged by the force. In addition, because a high-purity alumina ceramic material is used for the closed-end cylinder-shaped partition 22, which hermetically divides the laser gas side and the atmosphere side from each other, no impurities are generated (alumina has corrosion resistance to $F_2$ gas). Therefore, the laser gas is not contaminated. Furthermore, because the internally rotating magnets 17 on the laser gas side are entirely covered with the magnet cover 19 and the magnet holders 18, they do not directly contact the laser gas. Therefore, even when the plating provided on the surface of each magnet 17 becomes likely to flake off as time goes by, there is no likelihood that flakes from the plating will enter the space between the partition 22 and the internally rotating yoke 21, causing an operational abnormality. Thus, a stable operation can be performed for a long period of time.

FIG. 2 is a diagram similar to FIG. 1, showing the structure of a magnetic coupling mechanism according to another embodiment of the present invention. This embodiment differs from the embodiment shown in FIG. 1 in that an internally rotating yoke 21 is placed on the atmosphere side (motor 15 side) and an externally rotating yoke 23 is placed on the gas side (fan 11 side), and a magnet cover 19 and a magnet holder 18 are provided to cover externally rotating magnets 16 secured to the externally rotating yoke 23.

That is, an excimer laser apparatus has a container 10 (see FIG. 3) having an excimer gas sealed therein, and a ceramic partition 22 in the shape of a cylinder, one end of which is closed, is hermetically secured to an opening portion of a flange 14 provided on the wall of the container 10 by an appropriate device such that the partition 22 covers the opening of the flange 14 (in the illustrated example, a projection at the open end of the partition 22 is covered with a retaining plate and secured to the flange 14). The ceramic closed-end cylinder-shaped partition 22 hermetically divides the inside (gas side) of the container 10 and the outside (atmosphere side) of the container 10 from each other. The ceramic closed-end cylinder-shaped partition 22 is made of a ceramic material consisting essentially of high-purity alumina as in the case of the first embodiment. In this embodiment, the closed-end cylinder-shaped partition 22 is secured to the flange 14 so as to project toward the gas side (in the container 10) in reverse positional relation to the case of FIG. 1.

A motor 15 is installed on the atmosphere side. A cylindrical internally rotating yoke 21 is concentrically secured to the distal end of a motor shaft 20 of the motor 15. A plurality (6 in the illustrated example) of internally rotating magnets (permanent magnets) 17 are secured to the outer periphery of the internally rotating yoke 21 in such a manner as to be spaced circumferentially and extend parallel to each other in the axial direction. The internally rotating yoke 21 concentrically enters the closed-end cylinder-shaped partition 22 projecting toward the gas side. The internally rotating yoke 21 and the closed-end cylinder-shaped partition 22 are installed such that the internally rotating magnets 17 and the partition 22 do not contact each other.

Meanwhile, a fan 11 is installed on the gas side in the container 10. A fan shaft 12 of the fan 11 extends through a bearing 13 installed in the container 10. The distal end of the fan shaft 12 concentrically faces the bottom of the closed-end cylinder-shaped partition 22. A cylindrical externally rotating yoke 23 is concentrically secured to the distal end of the fan shaft 12. A plurality of externally rotating magnets (permanent magnets) 16 (6 magnets in the illustrated example, which is the same as the number of internally rotating magnets 17) are secured to the inner surface of the externally rotating yoke 23 in such a manner as to be spaced circumferentially and extend parallel to each other in the axial direction. The externally rotating yoke 23 and the closed-end cylinder-shaped partition 22, which projects toward the gas side, are concentrically fitted to each other such that the externally rotating magnets 16 concentrically surround the closed-end cylinder-shaped partition 22, and that the externally rotating yoke 23 and the closed-end cylinder-shaped partition 22 do not contact each other.

The externally rotating magnets 16 each have anticorrosive nickel plating or the like provided on the surface thereof to prevent a component thereof from being corroded by $F_2$ gas in the laser gas. To prevent flakes from the plating or the like from entering the space between the partition 22 and the externally rotating yoke 23, which would otherwise cause an operational abnormality, a cylindrical magnet cover 19 made of a metal is fitted so as to cover the whole inner periphery of each of the externally rotating magnets 16 secured to the inner surface of the externally rotating yoke 23. Further, a ring-shaped magnet holder 18 is secured closely to one end of the assembly of the externally rotating magnets 16 and the magnet cover 19 to cover the exposed end of the assembly and to secure the externally rotating magnets 16 to the externally rotating yoke 23, thereby preventing the externally rotating magnets 16 from directly contacting the laser gas and, at the same time, preventing plating flakes or the like from the externally rotating magnets 16 from leaking out into the laser gas.

By virtue of the described arrangement, the internally rotating yoke 21 secured to the motor shaft 20 of the motor 15 is concentrically located radially inside the closed-end cylinder-shaped partition 22, and the externally rotating yoke 23 integrally secured to the rotating shaft 12 of the fan 11 is concentrically located radially outside the closed-end cylinder-shaped partition 22. Thus, rotational force of the motor 15 is magnetically transmitted to the fan 11 by magnetic forces acting between the internally rotating magnets 17 secured to the outer periphery of the internally rotating yoke 21 and the externally rotating magnets 16 secured to the inner periphery of the externally rotating yoke 23. Moreover, because the closed-end cylinder-shaped partition 22 between the internally rotating yoke 21 and the externally rotating yoke 23 is made of a ceramic material, no eddy currents are induced in the closed-end cylinder-shaped partition 22 even when the yokes 21 and 23 rotate, and hence no heat is generated. Therefore, the rotational force transmission efficiency will not reduce, and there is no need to provide a cooling mechanism. Moreover, because force produced between the internally rotating yoke 21 and the externally rotating yoke 23 acts in the radial direction, but not in the thrust direction, there is no likelihood that the bearing 13, etc. will be damaged by the force. In addition, because a high-purity alumina ceramic material is used for the closed-end cylinder-shaped partition 22, which hermetically divides the laser gas side and the atmosphere side from each other, no impurities are generated, and the laser gas is not contaminated. Furthermore, because the externally rotating magnets 16 on the laser gas side are entirely covered with the magnet cover 19 and the magnet holder 18, they do not directly contact the laser gas. Therefore, even when the plating provided on the surface of each magnet 16 becomes likely to flake off as time goes by, there is no likelihood that flakes from the plating will enter the space between the partition 22 and the externally rotating yoke 23, causing an operational abnormality. Thus, a stable operation can be performed for a long period of time.

Incidentally, it is desirable to use a high-purity alumina ceramic material as a material of the ceramic closed-end cylinder-shaped partition 22, which is an important constituent element in the magnetic coupling mechanism according to the present invention, as stated above. The purity of the alumina ceramic material used should preferably be not lower than 99.5%. If the purity is lower than 99.5%, impurities in the ceramic material are likely to enter the laser gas in the form of an impurity gas, producing adverse effects on the laser oscillation operation.

Examples of other ceramic materials usable for the closed-end cylinder-shaped partition 22 include silicon nitride and zirconium oxide. A ceramic material containing silicon oxide is not preferable because it is corroded by $F_2$ gas in the laser gas.

The thickness of the ceramic closed-end cylinder-shaped partition 22 should preferably be within the range of from 1.5 to 10 millimeters. In the excimer laser apparatus, the pressure difference between the laser chamber and the atmosphere is from 3 to 4 atmospheric pressure. Therefore, in order to withstand the pressure difference, the partition 22 needs to have a thickness not less than 1.5 millimeters. On the other hand, the practical inner diameter of the closed-end cylinder-shaped partition 22 is from 40 to 100 millimeters. In this case, the gap between the internally rotating magnets 17 and the externally rotating magnets 16 for providing magnetic coupling at the maximum torque is from 6 to 12 millimeters. Therefore, the thickness of the partition 22 located between the internally rotating magnets 17 and the externally rotating magnets 16 needs to be not more than 10 millimeters.

Although the magnetic coupling mechanism for use in an excimer laser apparatus according to the present invention has been described above on the basis of the embodiments, the present invention is not limited to the foregoing embodiments but can be modified in a variety of ways. In particular, the present invention is applicable not only to excimer laser apparatus but also to fluorine laser apparatus.

As will be clear from the foregoing description, the magnetic coupling mechanism for use in a laser apparatus according to the present invention includes a first magnet group provided on an outer peripheral surface at one end of either of two shafts and a second magnet group radially coupled to the first magnet group through a ceramic partition constituting a part of the wall of the container of the laser chamber. The other shaft has the second magnet group provided on an inner peripheral surface thereof. Therefore, when rotational force is coupled, no eddy currents are induced in the partition, and no heat is generated. Accordingly, there is no reduction in rotational force transmission efficiency, and there is no need to provide a complicated mechanism, e.g. a cooling mechanism. Moreover, because force produced between the first magnet group and the second magnet group acts in the radial direction, but not in the thrust direction, there is no likelihood that bearings, etc. will be damaged by the force. If a high-purity aluminum oxide having a purity not lower than 99.5% is used for the ceramic partition hermetically dividing the laser gas side and the atmosphere side from each other, no impurities will be generated, which would otherwise contaminate the laser gas. If the surface of each magnet in the magnet group provided on the shaft in the laser chamber is plated and a surface of each magnet in this magnet group exposed in the laser chamber is covered with a metal member, the magnet group does not directly contact the laser gas. Even if the plating provided on the magnet surface becomes likely to flake off as time goes by, flakes from the plating will not enter the space between the partition and the laser chamber-side rotating member to cause an operational abnormality. Accordingly, it is possible to perform a stable operation for a long period of time.

What we claim is:

1. A laser apparatus using a laser gas containing fluorine, said laser apparatus using a magnetic coupling mechanism, wherein said magnetic coupling mechanism transmits rotational force from a rotating shaft outside a laser chamber to a rotating shaft of a gas-circulating fan in said laser chamber to rotate said gas-circulating fan, said magnetic coupling mechanism comprising:

a first magnet group provided over an outer peripheral surface at one end of either one of the rotating shaft outside said laser chamber and the rotating shaft of said gas-circulating fan with a magnetic material interposed therebetween;

a second magnet group radially coupled to said first magnet group through a ceramic partition constituting a part of a wall of a container of said laser chamber, said second magnet group being provided on an inner peripheral surface of another magnetic material; and the other of said two rotating shafts that is secured to said another magnetic material;

wherein a surface of each magnet in the magnet group provided on the shaft in said laser chamber is plated, and a surface of each magnet in said magnet group exposed in said laser chamber is covered with a metal member.

2. A laser apparatus according to claim 1, wherein said ceramic partition has a thickness within a range of from 1.5 millimeters to 10 millimeters.

3. A laser apparatus according to claim 2, wherein said ceramic partition is made of aluminum oxide, said aluminum oxide having a purity not lower than 99.5%.

4. A laser apparatus according to claim 1, wherein said ceramic partition is made of aluminum oxide, said aluminum oxide having a purity not lower than 99.5%.

* * * * *